United States Patent
Hayashi et al.

(10) Patent No.: US 12,068,451 B2
(45) Date of Patent: Aug. 20, 2024

(54) LITHIUM-ION SECONDARY BATTERY AND MANUFACTURING METHOD THEREOF

(71) Applicants: DENSO CORPORATION, Kariya (JP); TOYOTA JIDOSHA KABUSHIKI KAISHA, Toyota (JP)

(72) Inventors: Naohiro Hayashi, Kariya (JP); Keita Takahashi, Kariya (JP); Ryohei Yamamoto, Nisshin (JP); Ikuna Satou, Nisshin (JP); Shingo Ohta, Nagakute (JP); Masaki Watanabe, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 564 days.

(21) Appl. No.: 16/928,914

(22) Filed: Jul. 14, 2020

(65) Prior Publication Data

US 2021/0020982 A1    Jan. 21, 2021

(30) Foreign Application Priority Data

Jul. 16, 2019  (JP) ................................. 2019-131337

(51) Int. Cl.
*H01M 10/0525* (2010.01)
*H01M 10/0562* (2010.01)
*H01M 4/02* (2006.01)

(52) U.S. Cl.
CPC ... *H01M 10/0562* (2013.01); *H01M 10/0525* (2013.01); *H01M 2004/021* (2013.01); *H01M 2300/0068* (2013.01)

(58) Field of Classification Search
CPC ...................... H01M 10/0525; H01M 10/0562
See application file for complete search history.

(56) References Cited

U.S. PATENT DOCUMENTS

| | | | |
|---|---|---|---|
| 2009/0226790 A1 | 9/2009 | Kanamura et al. | |
| 2009/0229700 A1 | 9/2009 | Kanamura et al. | |
| 2015/0111110 A1* | 4/2015 | Watanabe | H01M 10/052 429/304 |
| 2020/0075960 A1 | 3/2020 | Wachsman et al. | |
| 2020/0152977 A1* | 5/2020 | Ohta | H01M 4/0471 |
| 2020/0369574 A1 | 11/2020 | Yamamoto et al. | |

FOREIGN PATENT DOCUMENTS

WO    2018/123479 A    7/2018

* cited by examiner

*Primary Examiner* — Osei K Amponsah
(74) *Attorney, Agent, or Firm* — MASCHOFF BRENNAN (57) ABSTRACT

A lithium-ion secondary battery includes: a single cell that includes a first electrode, a separator stacked on the first electrode, and a second electrode stacked on the separator. The first electrode includes a porous body that includes at least one LLZ-based solid electrolyte of a lithium lanthanum zirconate or the lithium lanthanum zirconate doped with an atom other than a Li atom, a La atom, and a Zr atom, and has a pore, and an active material held in the pore. The separator has a relative density of 80% or more, and includes the at least one LLZ-based solid electrolyte of the lithium lanthanum zirconate or the lithium lanthanum zirconate doped with the atom other than the Li atom, the La atom, and the Zr atom, and at least one of a B atom, a P atom, or a Si atom.

6 Claims, 3 Drawing Sheets

LITHIUM-ION SECONDARY BATTERY AND MANUFACTURING METHOD THEREOF

CROSS REFERENCE TO RELATED APPLICATION

The present application claims the benefit of priority from Japanese Patent Application No. 2019-131337 filed on Jul. 16, 2019. The entire disclosure of the above application is incorporated herein by reference.

TECHNICAL FIELD

The present disclosure relates to a lithium-ion secondary battery and a manufacturing method of the lithium-ion secondary battery.

BACKGROUND

In recent years, as a battery of an automobile or an electronic instrument, a battery in which a solid electrolyte is placed between a positive electrode and a negative electrode, that is, all-solid-state battery has been proposed. For example, in a comparative example, a battery includes a dense center layer, a first electrode, and a second electrode. The center layer includes a dense electrolyte material, a first surface, and a second surface on a side opposite to the first surface. The first electrode is placed on the first surface of the dense center layer. The second electrode is placed on the second surface of the dense center layer. In the comparative example, the electrolyte material of the center layer, a porous electrolyte material of the first electrode, and a porous electrolyte material of the second electrode may be same.

SUMMARY

A lithium-ion secondary battery includes: a single cell that includes a first electrode, a separator stacked on the first electrode, and a second electrode stacled on the separator. The first electrode includes a porous body that includes at least one LLZ-based solid electrolyte of a lithium lanthanum zirconate or the lithium lanthanum zirconate doped with an atom other than a Li atom, a La atom, and a Zr atom, and has a pore, and an active material held in the pore. The separator has a relative density of 80% or more, and includes the at least one LLZ-based solid electrolyte of the lithium lanthanum zirconate or the lithium lanthanum zirconate doped with the atom other than the Li atom, the La atom, and the Zr atom, and at least one of a B atom, a P atom, or a Si atom.

BRIEF DESCRIPTION OF DRAWINGS

The above and other features and advantages of the present disclosure will become more apparent from the following detailed description made with reference to the accompanying drawings. In the drawings.

DETAILED DESCRIPTION

As shown by the battery of the comparative example, when the center layer and the porous electrolyte material are laminated, for example, a green sheet of the center layer including an electrolyte particle and a binder and a green sheet of the porous electrolyte material including the binder and a pore forming material are laminated and sintered, and thereby the center layer and the porous electrolyte material can be integrally formed.

However, as shown in the comparative example, when the center layer and the porous electrolyte material are formed of the same electrolyte, crystals of electrolyte particles are similarly grown in the center layer and the porous electrolyte material during the sintering. Therefore, when a heating temperature at the time of the sintering is increased, a pore capacity of the porous electrolyte material becomes small due to the crystal growth of the electrolyte particles. The capacity of the battery is likely to be reduced. On the other hand, when the heating temperature at the time of the sintering is decreased, the electrolyte particles in the center layer and the porous electrolyte material are insufficiently bonded, and an internal resistance of the battery is likely to be increased.

One example of the present disclosure provides a lithium-ion secondary battery having both of a large capacity and a low internal resistance and a manufacturing method of the lithium-ion secondary battery.

According to one example embodiment, a lithium-ion secondary battery includes a single cell that includes a first electrode, a separator stacked on the first electrode, and a second electrode stacked on the separator. The first electrode includes a porous body that includes at least one LLZ-based solid electrolyte of a lithium lanthanum zirconate or the lithium lanthanum zirconate doped with an atom other than a Li atom, a La atom, and a Zr atom, and has a pore, and an active material held in the pore. The separator has a relative density of 80% or more, and includes the at least one LLZ-based solid electrolyte of the lithium lanthanum zirconate or the lithium lanthanum zirconate doped with the atom other than the Li atom, the La atom, and the Zr atom, and at least one of a B atom, a P atom, or a Si atom.

According to another example embodiment, a manufacturing method of the lithium-ion secondary battery of the above described aspect includes generating a stacking body by stacking a first layer and a second layer, wherein the first layer includes the LLZ-based solid electrolyte and a pore forming material and the second layer includes the LLZ-based solid electrolyte and a sintering aid including the at least one of the B atom, the P atom, or the Si atom and integrally forming the porous body and the separator by sintering the stacking body at a temperature equal to 700° or more and lower than 1050°.

The porous body in the lithium-ion secondary battery includes at least one LLZ-based solid electrolyte of the lithium lanthanum zirconate (that is, LLZ) or the LLZ doped with the atom other than the Li atom, the La atom, and the Zr atom. The separator includes the LLZ-based solid electrolyte and at least one of the B atom, the P atom, or the Si atom. The B atom, the P atom, or the Si atom are atoms in the sintering aid used in the manufacturing process of the lithium-ion secondary battery.

In a manufacturing process of the lithium-ion secondary battery, by using the sintering aid including the atom described above, it may be possible to suppress the crystal growth of the LLZ-based solid electrolyte in the porous body from excessively progressing during the sintering, and sufficiently grow the crystals of the LLZ-based solid electrolyte of the separator. As the result, it may be possible to provide both of the high capacity and the low internal resistance.

In the manufacturing method of the lithium-ion secondary battery, a first layer that becomes the porous body after the sintering and a second layer that becomes the separator after the sintering are laminated, and thereby a lamination body is generated. By sintering this lamination body, it may be possible to integrally form the porous body and the separator. The second layer includes a sintering aid that includes at least one of a B atom, a P atom, or a Si atom. Therefore, during the sintering, it may be possible to suppress the crystal growth of the LLZ-based solid electrolyte in the porous body from excessively progressing during sintering, and sufficiently grow the crystals of the LLZ-based solid electrolyte of the separator. As the result, it may be possible to provide both of the high capacity and the low internal resistance.

As described above, according to the example embodiment, it may be possible to provide the lithium-ion secondary battery having both of the large capacity and the low internal resistance and the manufacturing method of the lithium-ion secondary battery.

First Embodiment

An embodiment of a lithium-ion secondary battery and a manufacturing method of the lithium-ion secondary battery will be described with reference to FIG. 1. A lithium-ion secondary battery 1 includes a single cell 11 including a first electrode 2, a separator 3 laminated (or stacked) on the first electrode 2, and a second electrode 4 laminated on the separator 3. The first electrode 2 includes a porous body 21 that includes at least one LLZ-based solid electrolyte of a lithium lanthanum zirconate (LLZ) or the lithium lanthanum zirconate doped with an atom other than a Li atom, a La atom, and a Zr atom, and an active material 22. The porous body 21 has a lot of pores 211, and the active material 22 is held by the pores 211. The separator 3 includes at least one LLZ-based solid electrolyte of the LLZ or the lithium lanthanum zirconate doped with the atom other than the Li atom, the La atom, and the Zr atom, and at least one of a B atom, a P atom, or a Si atom. A relative density of the separator 3 is equal to 80% or more.

The lithium-ion secondary battery 1 may include one single cell 11, or multiple single cells 11. For example, the lithium-ion secondary battery 1 in the present embodiment includes one single cell 11. A current collector 12 is laminated on each of a surface of the first electrode 2 in the single cell 11 and a surface of the second electrode 4. By connecting a load or a power generator to these current collectors 12, the lithium-ion secondary battery 1 can be charged or discharged. As the current collector 12, for example, a conductor such as a metal foil or a metal plate, a composite material obtained by dispersing a carbon or a conductive powder such as a conductive oxide in an insulator such as glass, or the like can be used.

Although not shown in the drawings, when the lithium-ion secondary battery 1 includes the multiple single cells 11, the multiple single cells 11 can be electrically connected via the collector 12 by alternately superposing the current collector 12 and the single cell 11. For example, by laminating the current collector 12 and the single cell 11 so that one surface of the current collector 12 contacts with the first electrode 2 and another surface contacts with the second electrode 4, the multiple single cells 11 are connected in series. By laminating the current collector 12 and the single cell 11 so that the current collector 12 is placed between the electrodes 2 and between the electrodes 4, the multiple single cells 11 can be connected in parallel.

The first electrode 2 may be a positive electrode or a negative electrode. The first electrode 2 in the present embodiment is specifically the positive electrode.

A shape of the first electrode 2 may be provided in various forms. For example, although not shown in the drawings, the first electrode 2 in the present embodiment has a rectangular plate shape formed by the porous body 21.

The porous body 21 includes at least one LLZ-based solid electrolyte of the LLZ or the lithium lanthanum zirconate doped with the atom other than the Li atom, the La atom, and the Zr atom. That is, the porous body 21 may be formed of the LLZ-based solid electrolyte or may be formed of the LLZ-based solid electrolyte and a substance other than the LLZ-based solid electrolyte.

For example, the porous body 21 may further include at least one of the B atom, the P atom, or the Si atom. That is, in the manufacturing process of the lithium-ion secondary battery 1, the sintering aid including these atoms may be added to the porous body 21. In this case, the heating temperature at the time of sintering the porous body 21 is further lowered, and an energy consumption in the manufacturing process of the lithium-ion secondary battery 1 can be further reduced.

In the manufacturing process of the lithium-ion secondary battery 1, when the sintering aid is also added to the porous body 21, a total content of the B atom, the P atom, and the Si atom in the porous body 21 is preferably less than a total content of the B atom, the P atom, and the Si atom in the separator 3. In this case, it may be possible to promote the crystal growth of the LLZ-based solid electrolyte in the separator 3 and more surely suppress the excessive crystal growth of the LLZ-based solid electrolyte in the porous body 21. As the result, it may be possible to more effectively suppress the relative density of the porous body 21 from increasing, and more increase the capacity of the lithium-ion secondary battery 1.

The porous body 21 has the pores 211. The active material 22 is held in the pores 211 of the porous body 21. In the pores 211, in addition to the active material 22, a conductive aid or a solid electrolyte different from the LLZ-based solid electrolyte, liquid electrolyte, or the like may be held.

Figure 1:
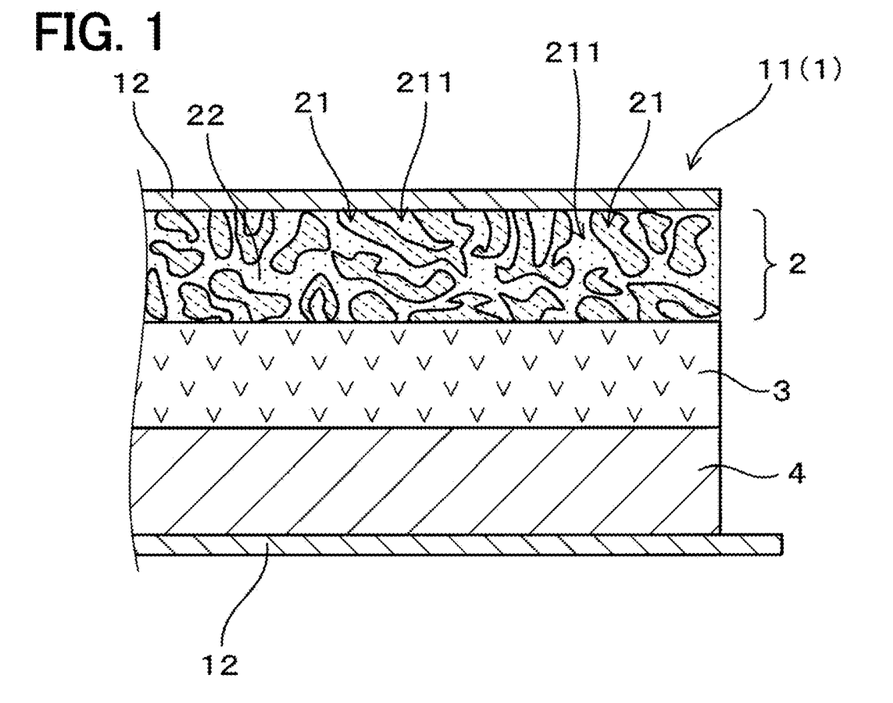
FIG. 1 is a cross-sectional view showing a main part of a lithium-ion secondary battery according to a first embodiment.

The pore 211 of the porous body 21 may have a continuous pore structure, as shown in FIG. 1, for example. The relative density of the porous body 21, that is, a ratio of an apparent density of the entire porous body 21 including the pore 211 to a density of the part excluding the pore 211 in the porous body 21 is, for example, equal to 60% or less. From the viewpoint of maintaining the shape of the porous body 21, the relative density of the porous body 21 can be, for example, equal to 30% or more.

The relative density of the porous body 21 is a value calculated based on a three-dimensional reconstruction image obtained by a FIB/SEM (that is, focusing ion beam/scanning electron microscope) tomography method. More specifically, processing of a sample by a FIB device and observation of a processed surface are repeated, and multiple SEM images are acquired. The three-dimensional reconstruction image is obtained by reconstructing these SEM images on image analysis software. The obtained three-dimensional reconstruction image is binarized so that a boundary between the porous body 21 and the other is maintained. The ratio calculated based on the binarized image obtained as described above, that is, the ratio of the total volume of the volume of LLZ-based solid electrolyte and the volume of the sintering aid to the apparent volume of the porous body 21 is set to the relative density of the porous body 21.

The active material 22 can be appropriately selected in accordance with the polarity of the first electrode 2. For example, when the first electrode 2 is a positive electrode, as the active material 22 of the first electrode 2, a sulfur-based material including a sulfur atom or an oxide-based active material made of an oxide can be used. As the sulfur-based active material, specifically, an elemental sulfur, a lithium sulfur ($Li_2S$), a sulfur doped with a lithium, or the like can be used. As the oxide-based active material, specifically, a lithium cobalt oxide ($LiCoO_2$), $LiNi_{1/3}Mn_{1/3}Co_{1/3}O_2$, a lithium manganese oxide ($LiMnO_2$), a lithium iron phosphate ($LiFePO_4$), or the like can be used.

In a case where the first electrode 2 is the positive electrode, the active material 22 preferably includes the sulfur atom. In this case, it may be possible to increase the capacity of the lithium-ion secondary battery 1. The active material 22 in the present embodiment is, specifically, the elemental sulfur.

When the first electrode 2 is the negative electrode, as the active material 22 of the first electrode 2, a metal lithium, a carbon, a $Li_4Ti_5O_{12}$, or the like can be used.

As shown in FIG. 1, the separator 3 is integrally formed with the porous body 21 of the first electrode 2. The relative density of the separator 3 is equal to 80% or more. Thereby, the separator 3 can suppress the short circuit between the first electrode 2 and the second electrode 4. From the viewpoint of surely suppressing the short circuit between the first electrode 2 and the second electrode 4, the relative density of the separator 3 is preferably equal to 90% or more, or is preferably equal to 95% or more.

The separator 3 includes at least one LLZ-based solid electrolyte of the LLZ or the LLZ doped with the atom other than the Li atom, the La atom, and the Zr atom, and at least one of the B atom, the P atom, or the Si atom. That is, in the manufacturing process of the lithium-ion secondary battery 1, the sintering aid including these atoms may be added to the separator 3. The sintering aid including these atoms melts before the LLZ-based solid electrolyte melts at the time of sintering the porous body 21 and the separator 3 in the manufacturing process of the lithium-ion secondary battery 1. The melt of the sintering aid contacts with the LLZ-based solid electrolyte, and thereby it may be possible to promote the crystal growth of the LLZ-based solid electrolyte.

Accordingly, by adding the sintering aid to the separator 3 in the manufacturing process of the lithium-ion secondary battery 1, it may be possible to increase a speed of the crystal growth of the LLZ-based solid electrolyte in the separator 3 during the sintering. As the result, while the crystal growth of the LLZ-based solid electrolyte in the porous body 21 is suppressed from being excessively promoted, the crystal growth of the LLZ-based solid electrolyte in the separator 3 can be promoted.

From the viewpoint of improving the effect of promoting the crystal growth of the LLZ-based solid electrolyte, it is preferable to use the sintering aid having a low melting point. A melting point of the sintering aid including the B atom is the lowest, a melting point of the sintering aid including the P atom is higher than the melting point of the sintering aid including the B atom and lower than a melting point of the sintering aid including the Si atom. Accordingly, from the viewpoint of promoting the crystal growth of the LLZ-based solid electrolyte in the separator 3, it is most preferable that the separator 3 includes the B atom, and, next, it is preferable that the separator 3 includes the P atom.

When the sintering aid is also added to the porous body 21 in the manufacturing process of the lithium-ion secondary battery 1, the melting point of the sintering aid used for the porous body 21 is preferably higher than the melting point of the sintering aid used for the separator 3. That is, when the separator 3 includes the B atom, the porous body 21 preferably includes at least one of the P atom or the Si atom. When the separator 3 includes the P atom, the porous body 21 preferably includes the Si atom.

As described above, by setting the melting point of the sintering aid in the porous body 21 to be higher than the melting point of the sintering aid in the separator 3, it may be possible to surely suppress the excessive crystal growth of the porous body 21 while promoting the crystal growth of the separator 3. As the result, it may be possible to more effectively suppress the relative density of the porous body 21 from increasing, and more increase the capacity of the lithium-ion secondary battery 1.

The content of the B atom, the P atom, and the Si atom in the separator 3 is preferably equal to 12 mol % or more and equal to 65 mol % or less with respect to a La (lanthanum) atom in the separator 3. In this case, while it may be possible to secure the sufficient amount of LLZ-based solid electrolyte in the separator 3 and improve a lithium-ion conductivity, it may be possible to obtain the effect of promoting the sintering by the sintering aid.

The LLZ-based solid electrolyte in the separator 3 may be same as or different from the LLZ-based solid electrolyte in the porous body 21. An average crystal grain size of the LLZ-based solid electrolyte in the separator 3 is preferably larger than an average crystal grain size of the LLZ-based solid electrolyte in the porous body 21. In this case, while it may be possible to further increase the relative density of the separator 3, it may be possible to further decrease the relative density of the porous body 21. As the result, it may be possible to further improve the lithium-ion conductivity and further reduce the internal resistance. Furthermore, it may be possible to further increase the amount of the lithium that can be stored in the pores 211 and further increase the capacity of the lithium-ion secondary battery 1.

The average crystal grain size of the LLZ-based solid electrolyte in the porous body 21 and the separator 3 can be measured by the following method. That is, first, the lithium-ion secondary battery 1 is cut in a lamination direction (also referred to as stacking direction) from the porous body 21 to the separator 3 to expose the cross section. This cross section is observed by the scanning electron microscope and the SEM image is acquired. Maximum diameters of the multiple LLZ-based solid electrolyte crystals in the SEM image are measured. An average of these maximum diameters is set to the average crystal grain size of the LLZ-based solid electrolyte. Although the number of LLZ-based solid electrolyte crystals used for calculating the average crystal grain size is not limited, an accurate value can be calculated as the number of crystals used for the average crystal grain size increases. From this viewpoint, the number of LLZ-based solid electrolyte crystals used for calculating the average crystal grain size (in other words, average crystal particle size) is preferably equal to 10 or more, or preferably equal to 20 or more.

The first electrode 2 is placed on a first surface of the separator 3, and the second electrode 4 is laminated on a second surface opposite to the first surface. The second electrode 4 has a polarity different from that of the first electrode 2. That is, when the first electrode 2 is the positive electrode, the second electrode 4 is the negative electrode. When the first electrode 2 is the negative electrode, the second electrode 4 is the positive electrode.

A configuration of the second electrode 4 is not particularly limited. For example, the second electrode 4 may have a configuration formed of only an active material different from the active material 22 of the first electrode 2, or, similarly to the first electrode 2, may have a configuration in which the active material is held in the pore of the porous body.

The active material of the second electrode 4 can be appropriately selected in accordance with the polarity of the second electrode 4. For example, the second electrode 4 in the present embodiment is a lithium plate made of the metal lithium as the active material.

Next, the manufacturing method of the lithium-ion secondary battery 1 in the present embodiment will be described. The manufacturing method of the lithium-ion secondary battery 1 in the present embodiment includes a lamination process of laminating a first layer that becomes the porous body 21 after sintering on a second layer that becomes the separator 3 after the sintering for generating a lamination body (also referred to as stacking body), and a integration sintering process of integrally forming the porous body 21 and the separator 3 by sintering the lamination body at a temperature of 700° to 1050°.

In the lamination process, various methods may be used as a specific method of generating the first layer and the second layer. For example, according to one method of the lamination process, after a separator mixture containing the LLZ-based solid electrolyte, a solvent, the sintering aid, and the binder is prepared, this separator mixture is molded in a sheet shape. Thereby, the green sheet as the first layer can be generated. As the LLZ-based solid electrolyte used for the separator mixture, for example, a solid electrolyte crystal pulverized into powder can be used.

A volume-based cumulative 50% grain size (that is, d50) of the LLZ-based solid electrolyte used for the separator mixture is preferably equal to 1.0 μm or less. In this case, since a surface area of the LLZ-based solid electrolyte in the first layer becomes larger, it may be possible to further promote the crystal growth of the LLZ-based solid electrolyte during the sintering. As the result, it may be possible to further increase the relative density of the separator 3. Furthermore, in this case, while suppressing formation of defects such as pinholes in the first layer, it may be possible to easily reduce a thickness of the first layer. As the result, it may be possible to further reduce a thickness of the obtained separator 3.

As the sintering aid, an inorganic including at least one of the B atom, the P atom, or the Si atom can be used. From the viewpoint of increasing the capacity of the lithium-ion secondary battery 1, as the sintering aid, at least one of a $Li_3BO_3$, a $Li_6B_4O_9$, a $L_4B_2O_5$, a $LiBO_2$, a $B_2O_3$, a $Li_3PO_4$, a $Li_4SiO_4$, or a $Li_2SiO_3$ is preferably used.

After an electrode mixture containing the LLZ-based solid electrolyte, the solvent, the pore forming material, and the binder is prepared, this electrode mixture is formed in the sheet shape. Thereby, a green sheet as the second layer can be generated. As the pore forming material, for example, acrylic resin powder can be used. The electrode mixture may include the sintering aid described above in addition to the LLZ-based solid electrolyte, the solvent, the pore forming material, and the binder.

After the obtained green sheet of the porous body 21 and the obtained green sheet of the separator 3 as described above are laminated, the green sheets are integrated by a method such as thermocompression. Thereby, the lamination body can be obtained.

According to another method of the lamination process, by compression-molding mixed powder including the LLZ-based solid electrolyte and the pore forming material, a green compact is generated as the first layer. By compression-molding the mixed powder including the LLZ-based solid electrolyte and the sintering aid on this green compact, the green compact is formed as the second layer on the first layer. The lamination body can be obtained.

In the co-sintering process, the lamination body obtained in the lamination process is heated at a temperature equal to 700° or more and less than 1050°. When the heating temperature in the integration sintering process is within a certain range described above, the sintering aid melts before the LLZ-based solid electrolyte melts, and the melt of the sintering aid occurs. This melt of the sintering aid contacts with the LLZ-based solid electrolyte, and thereby it may be possible to promote the crystal growth of the LLZ-based solid electrolyte. Accordingly, by heating the lamination body at the temperature within the certain range described above, it may be possible to promote the crystal growth of the LLZ-based solid electrolyte in the separator 3.

On the other hand, a precursor of the porous body 21 includes the pore forming material. Therefore, in the integration sintering process, first, the pore forming material disappears, and the pores 211 is formed. Thereafter, the crystal growth of the LLZ-based solid electrolyte in the precursor of the porous body 21 starts. Then, the precursor of the porous body 21 does not include the porous body 21 or the effect of the sintering aid is lower than that of the precursor of the separator 3. Therefore, the speed of the crystal growth of the LLZ-based solid electrolyte in the porous body 21 is slower than that of the LLZ-based solid electrolyte in the separator 3.

Accordingly, in the integration sintering process, by heating the lamination body at the temperature within the certain range described above, it may be possible to sufficiently grow the crystal of the LLZ-based solid electrolyte in the separator 3 while suppressing the excessive progress of the crystal growth of the LLZ-based solid electrolyte in the porous body 21.

The heating temperature in the integration sintering process is preferably equal to 900° or more. In this case, while maintaining a magnitude relationship of the speed of the crystal growth described above, it may be possible to further increase the speed of the crystal growth of the LLZ-based solid electrolyte in both of the porous body 21 and the separator 3.

On the other hand, when the heating temperature in the integration sintering process is excessively high, the crystal growth tends to occur in the LLZ-based solid electrolyte alone. Therefore, the crystal growth of the LLZ-based solid electrolyte in the porous body 21 excessively proceeds, and the capacity of the lithium-ion secondary battery 1 may be caused to decrease. By setting the heating temperature in the integration sintering process to a temperature less than 1050° C., it may be possible to prevent the capacity from decreasing. From the similar viewpoint, the heating temperature in the integration sintering process is preferably equal to 1000° C. or lower.

Based on the above, the porous body 21 and the separator 3 can be integrally formed. The active material 22 is held by the pore 211 of the porous body 21 obtained as described above, and the second electrode 4 is placed on the back surface on the side having the porous body 21 in the separator 3. Thereby, the lithium-ion secondary battery 1 can be formed.

Various methods may be used as the method of causing the pore 211 of the porous body 21 to hold the active material 22. For example, by filling the pore 211 with the active material 22 itself, the active material 22 may be held in the pore 211. For example, after the pore 211 is filled with the precursor of the active material 22, a process such as heating is executed. Thereby, the precursor can be converted into the active material 22.

Second Embodiment

Figure 2:
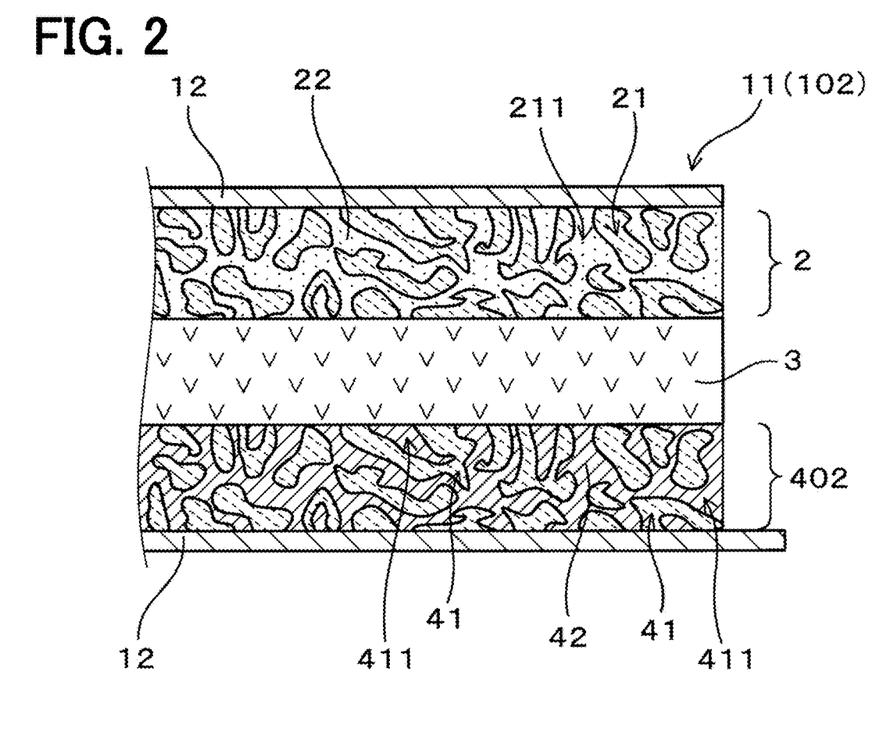
FIG. 2 is a cross-sectional view showing a main part of a lithium-ion secondary battery in which both of the first electrode and the second electrode include a porous body according to a second embodiment.

The present embodiment shows another aspect of the second electrode. Those of reference numerals used in the second and subsequent embodiments which are the same reference numerals as those used in the above-described embodiment denote the same components as in the previous embodiment unless otherwise indicated. In a lithium-ion secondary battery 102 in the present embodiment, the porous body 21 is referred to as a first porous body 21, and the active material 22 of the first electrode 2 is referred to as a first active material 22. The first electrode 2 in the present embodiment has the similar configuration to that in the first embodiment, except that the first active material 22 is the sulfur doped with the lithium. The separator 3 in the present embodiment has the similar configuration to that of the first embodiment.

As shown in FIG. 2, a second electrode 402 in the present embodiment includes a second porous body 41 that includes the LLZ-based solid electrolyte and a pore 411, and a second active material 42 held by the pore 411.

A specific configuration of the second porous body 41 in the second electrode 402 is similar to that of that of the first porous body 21 in the first electrode 2. That is, the second porous body 41 may be formed of the LLZ-based solid electrolyte or may be formed of the LLZ-based solid electrolyte and the substance other than the LLZ-based solid electrolyte. The LLZ-based solid electrolyte in the second porous body 41 may be same as or different from the LLZ-based solid electrolyte in the first porous body 21 or the separator 3.

The second porous body 41 may further include at least one of the B atom, the P atom, or the Si atom. That is, in the manufacturing process of the lithium-ion secondary battery 1, the sintering aid including these atoms may be added to the second porous body 41. In this case, the heating temperature at the time of sintering the second porous body 41 is further lowered, and an energy consumption in the manufacturing process of a lithium-ion secondary battery 102 can be further reduced.

In the manufacturing process of the lithium-ion secondary battery 1, when the sintering aid is also added to the second porous body 41, a total content of the B atom, the P atom, and the Si atom in the second porous body 41 is preferably less than a total content of the B atom, the P atom, and the Si atom in the separator 3. In this case, it may be possible to improve the crystal growth of the LLZ-based solid electrolyte in the separator 3 and more surely suppress the excessive crystal growth of the LLZ-based solid electrolyte in the second porous body 41. As the result, it may be possible to more effectively suppress the relative density of the second porous body 41 from increasing, and more increase the capacity of the lithium-ion secondary battery 1.

From the similar viewpoint, a melting point of the sintering aid used for the second porous body 41 is preferably higher than the melting point of the sintering aid used for the separator 3. More specifically, when the separator 3 includes the B atom, the second porous body 41 preferably includes at least one of the P atom or the Si atom. When the separator 3 includes the P atom, the second porous body 41 preferably includes the Si atom.

The second porous body 41 has the pores 411. The second active material 42 is held in the pores 411 of the second porous body 41. In the pores 411, in addition to the second active material 42, the conductive aid or the solid electrolyte different from the LLZ-based solid electrolyte, the liquid electrolyte, or the like may be held.

The pores 411 of the second porous body 41 may have the continuous pore structure. The relative density of the second porous body 41 can be set to be, for example, 60% or less. From the viewpoint of maintaining the shape of the second porous body 41, the relative density of the second porous body 41 can be, for example, equal to 30% or more. Similarly to the relative density of the first porous body 21, the relative density of the second porous body 41 is the value calculated based on a three-dimensional reconstruction image obtained by a FIB/SEM (that is, focusing ion beam/scanning electron microscope) tomography method.

Similarly to the first active material 22, the second active material 42 can be appropriately selected in accordance with the polarity of the second electrode 402. The second active material 42 in the present embodiment is specifically the metal lithium.

The lithium-ion secondary battery 102 in the present embodiment is generated by the similar manufacturing method to that in the first embodiment, except that, in the lamination process, the precursor of the first porous body 21, the precursor of the separator 3, and the precursor of the second porous body 41 are laminated. The generation method of the precursor of the second porous body 41 is similar to that of the precursor of the first porous body 21.

The lithium-ion secondary battery 102 in the present embodiment achieves the similar effects to that in the first embodiment.

EXPERIMENTAL EXAMPLE

In the present example, test objects are generated by variously changing the heating temperature or the sintering aid in the integration sintering process and laminating the separator 3 and the porous body 21. The relative densities of the porous body 21 and the separator 3 are measured. The generation method of the test object will be described below. A measurement method of the relative density is the method described above.

(Test Object T1)

For generating a test object T1, first, the electrode mixture including the powder of the LLZ, the $Li_3BO_3$ as the sintering aid, the acrylic resin as the pore forming material, the solvent, and the binder was prepared. The content of the sintering aid in the electrode mixture was adjusted so that a molar ratio of the B atom to the La (lanthanum) atom of the LLZ was 0.13. This electrode mixture was formed in the sheet shape by using an applicator, and the green sheet was generated as the first layer. The thickness of the first layer was set to 300 μm. The melting point of the $Li_3BO_3$ is 820° C.

Additionally, the separator mixture including the powder of the LLZ, the $Li_3BO_3$ as the sintering aid, the solvent, and the binder was prepared. The content of the sintering aid in the separator mixture was adjusted so that a molar ratio of the B atom to the La atom of the LLZ was 0.37. This separator mixture was formed in the sheet shape by using the applicator, and the green sheet was generated as the second layer. The thickness of the second layer was set to 300 μm.

The first layer and the second layer formed as described above are cut into a desired size, the two are superposed to obtain the lamination body. The lamination body is subjected to a warm isostatic pressing and adhered with two green sheets, and thereafter heated at a temperature shown in a table 1 in an air atmosphere. The separator 3 and the porous body 21 are integrally formed. As described above, the test object T1 was obtained. A table 1 shows the relative density of the porous body 21 and the relative density of the separator 3 in the test object T1. In the table 1, the test object is referred to as "TB", the heating temperature is referred to as "HEAT TEMP", and the sintering aid is referred to as "ST AID".

(Test Objects T2 to T4)

Generation methods of test objects T2 to T4 are similar to that of the test object T1, except that the kind and the addition amount of the sintering aid are changed as shown in the table 1. The table 1 shows the relative densities of the porous body 21 and the relative densities of the separator 3 in these test objects. The melting point of the $Li_3PO_4$ that is the sintering aid used for the test object T2 is 840° C. The melting point of the $Li_2SiO_3$ that is the sintering aid used for the test object T3 is 1200° C.

(Test Object T5)

A generation method of a test object T5 is similar to that of the test object T1, except that the addition amount of the sintering aid in the electrode mixture is set to be same as the addition amount of the sintering aid in the separator mixture. The table 1 shows the relative density of the porous body 21 and the relative density of the separator 3 in the test object T5.

(Test Object T6)

A generation method of a test object T6 is similar to that of the test object T1, except that the sintering aid is not added to the electrode mixture and the separator mixture. The table 1 shows the relative density of the porous body 21 and the relative density of the separator 3 in the test object T6.

(Test Objects T7 to T10) Generation methods of test objects T7 to T10 are similar to that of the test object T1, except that the kind and the addition amount of the sintering aid are changed as shown in a table 2. The table 2 shows the relative densities of the porous body 21 and the relative densities of the separator 3 in these test objects.

(Test Object T11)

A generation method of a test object T11 is similar to that of the test object T1, except that the sintering aid is not added to the electrode mixture. The table 2 shows the relative density of the porous body 21 and the relative density of the separator 3 in the test object T11.

(Test Object T12 and Test Object T13)

Generation methods of a test object T12 and a test object T13 are similar to that of the test object T11, except that the heating temperature at the time of the sintering is set to a temperature shown in the table 2. The table 2 shows the relative densities of the porous body 21 and the relative densities of the separator 3 in these test objects.

(Test Object T14) A generation method of a test object T14 is similar to that of the test object Test object T1, except that the addition amount of the sintering aid and the heating temperature at the time of the sintering aid are changed as shown in a table 3. The table 3 shows the relative density of the porous body 21 and the relative density of the separator 3 in the test object T14. In the table 3, the average crystal gain size is referred to as "AVE CRY GRAIN SIZE".

Regarding the test object T12 and the test object T14, the average crystal grain size of the LLZ in the porous body 21 and the separator 3 and the electrical conductivities of the test objects were measured by the following method.

(Average Crystal Grain Size)

Figure 3:
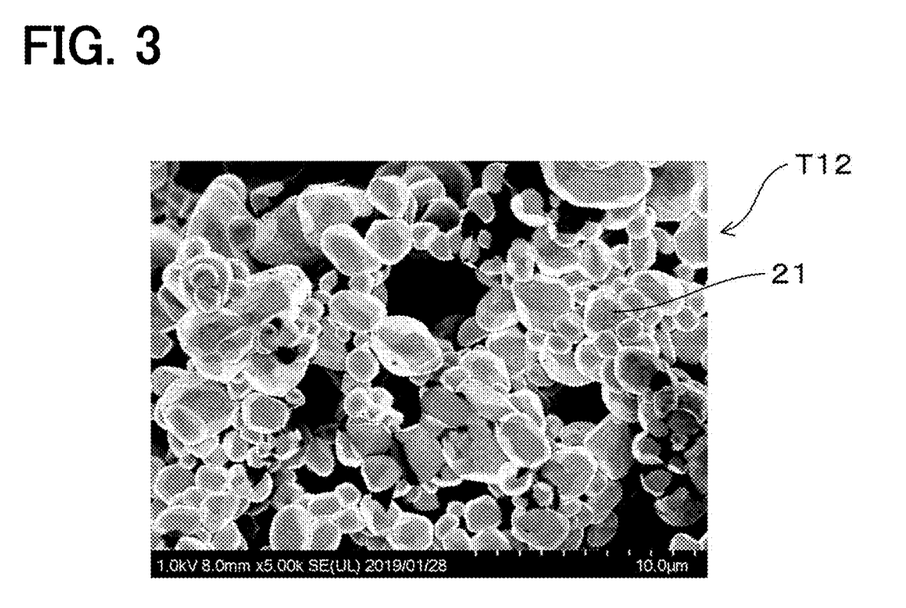
FIG. 3 is a SEM image of the porous body of a test object T12 according to an experimental example.
Figure 4:
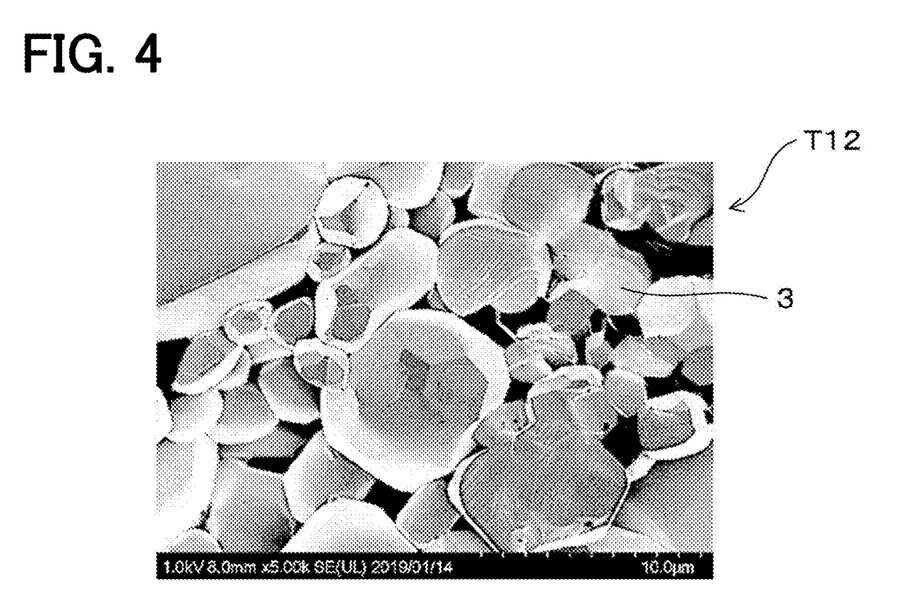
FIG. 4 is a SEM image of a separator of the test object T12 according to the experimental example.
Figure 5:
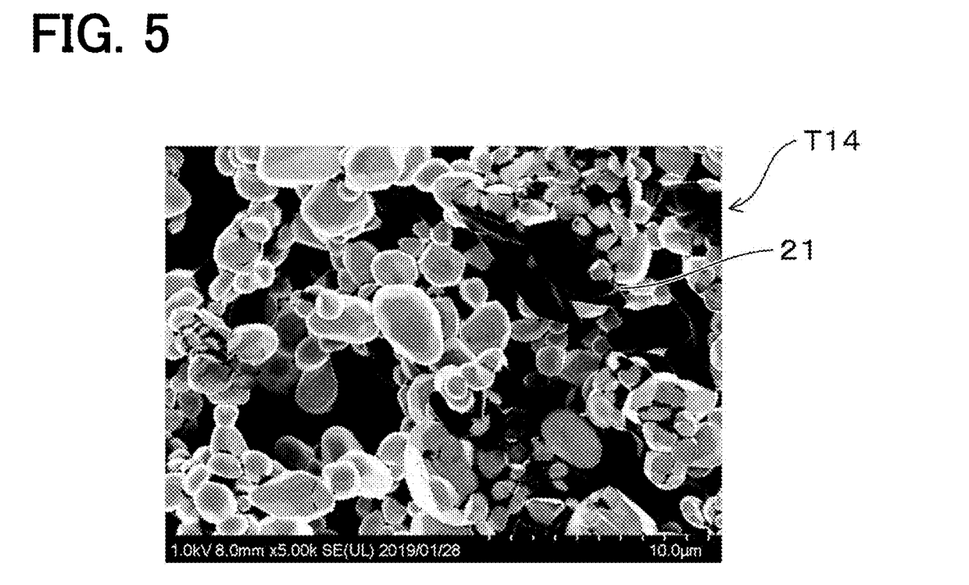
FIG. 5 is a SEM image of the porous body of a test object T14 according to the experimental example.
Figure 6:
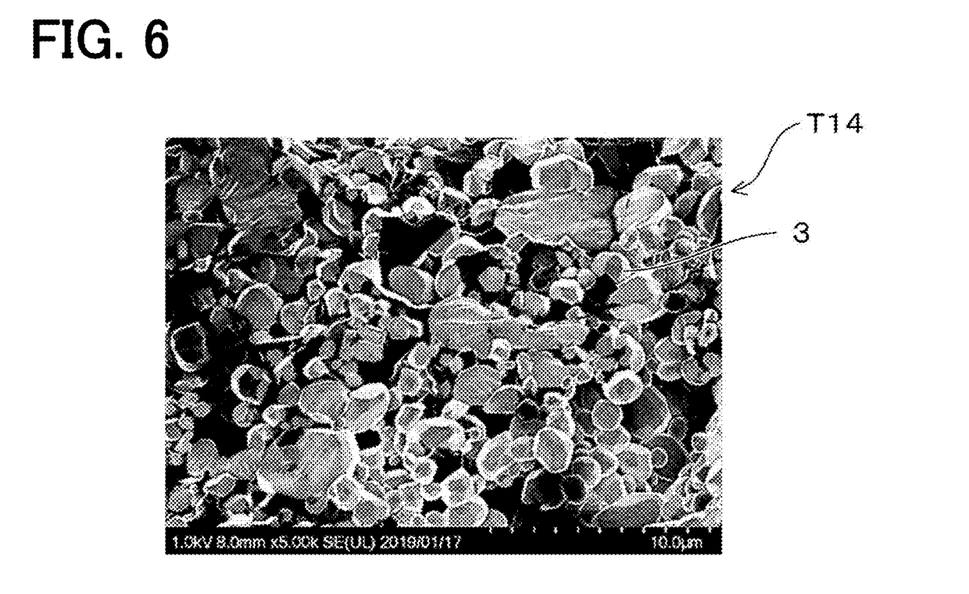
FIG. 6 is a SEM image of the separator of the test object T14 according to the experimental example.

The test object was cut in the lamination direction from the porous body 21 to the separator 3 (or from the separator 3 to the porous body 21), and the cross section was exposed. This cross section was observed by the scanning electron microscope, the SEM image with a magnifying power of 5000 was acquired. FIG. 3 shows the SEM image of the porous body 21 in the test object T12. FIG. 4 shows the SEM image of the separator 3. FIG. 5 shows the SEM image of the porous body 21 in the test object T14. FIG. 6 shows the SEM image of the separator 3. As shown in FIGS. 3 to 6, the crystals of the LLZ in the porous body 21 and the separator 3 are granular. The adjacent crystals of the LLZ were connected to each other and integrated.

Maximum diameters of twenty crystals or more randomly selected from the crystals of the LLZ existing in these SEM images ware measured. The average of these maximum diameters was set to the average crystal grain size of the LLZ. The table 3 shows the average crystal grain size of the LLZ in each of the porous body 21 of the test object T12, the separator 3 of the test object T12, the porous body 21 of the test object T14, and the separator 3 of the test object T14.

(Electrical Conductivity of Test Object)

After a gold paste was applied to both of end surfaces in a thickness direction of the test object, baking was performed at 600° C., terminals were formed. The test object was connected to an impedance measurement device ("1260A" manufactured by Solartron Company) via these terminals, and an electric resistance value was measured within a frequency range of 10pHz to 32 MHz. The electrical conductivity was calculated based on the electric resistance value obtained as described above, an area of the end surface in the thickness direction of the test object, and a thickness of the test object. The table 3 shows electrical conductivities of the test object T12 and the test object T14.

TABLE 1

| | | TB T1 | TB T2 | TB T3 | TB T4 | TB T5 | TB T6 |
|---|---|---|---|---|---|---|---|
| HEAT TEMP | | 1000° C. | 1000° C. | 1000° C. | 900° C. | 1000° C. | 1000° C. |
| POROUS BODY | KIND OF ST AID | $Li_3BO_3$ | $Li_3PO_4$ | $Li_2SiO_3$ | $Li_3BO_3$ | $Li_3BO_3$ | — |
| | MOLAR RATIO OF STAID | 0.13 | 0.11 | 0.094 | 0.37 | 0.37 | — |

TABLE 1-continued

|  |  | TB T1 | TB T2 | TB T3 | TB T4 | TB T5 | TB T6 |
|---|---|---|---|---|---|---|---|
| SEPARATOR | RELATIVE DENSITY | 60% | 58% | 55% | 40% | 92% | 50% |
|  | KIND OF ST AID | $Li_3BO_3$ | $Li_3PO_4$ | $Li_2SiO_3$ | $Li_3BO_3$ | $Li_3BO_3$ | — |
|  | MOL RATIO OF ST AID | 0.37 | 0.3 | 0.27 | 0.45 | 0.37 | — |
|  | RELATIVE DENSITY | 97% | 96% | 95% | 97% | 97% | 75% |

TABLE 2

|  |  | TB T7 | TB T8 | TB T9 | TB T10 | TB T11 | TB T12 | TB T13 |
|---|---|---|---|---|---|---|---|---|
| HEAT TEMP |  | 1000° C. | 1000° C. | 1000° C. | 1000° C. | 1000° C. | 950° C. | 1050° C. |
| POROUS BODY | KIND OF ST AID | $Li_3PO_4$ | $Li_3PO_4$ | $Li_2SiO_3$ | $Li_2SiO_3$ | — | — | — |
|  | MOLAR RATIO OF ST AID | 0.094 | 0.11 | 0.094 | 0.094 | — | — | — |
|  | RELATIVE DENSITY | 55% | 58% | 55% | 55% | 50% | 45% | 97% |
| SEPARATOR | KIND OF ST AID | $Li_3BO_3$ | $Li_3BO_3$ | $Li_3BO_3$ | $Li_3PO_4$ | $Li_3BO_3$ | $Li_3BO_3$ | $Li_3BO_3$ |
|  | MOL RATIO OF STAID | 0.37 | 0.37 | 0.37 | 0.3 | 0.37 | 0.37 | 0.37 |
|  | RELATIVE DENSITY | 97% | 97% | 96% | 96% | 97% | 97% | 97% |

TABLE 3

|  |  | TB T12 | TB T14 |
|---|---|---|---|
| HEAT TEMP |  | 950° C. | 750° C. |
| POROUS BODY | KIND OF ST AID | — | $Li_3BO_3$ |
|  | CONTENT OF ST AID | — | 0.094 |
|  | RELATIVE DENSITY | 45% | 40% |
|  | AVE CRY GRAIN SIZE | 2.5 μm | 2.5 μm |
| SEPARATOR | KIND OF ST AID | $Li_3BO_3$ | $Li_3PO_4$ |
|  | CONTENT OF ST AID | 0.37 | 0.37 |
|  | RELATIVE DENSITY | 97% | 72% |
|  | AVE CRY GRAIN SIZE | 8 μm | 2.5 μm |
| ELECTRICAL CONDUCTIVITY |  | $7.0 \times 10^{-5}$ | $1.0 \times 10^{-5}$ |

As shown in the table 1, in the manufacturing process of the test objects T1 to T4, the sintering aid is used for both of the porous body 21 and the separator 3. The amount of the sintering aid added to the porous body 21 is less than the amount of the sintering aid added to the separator 3. Therefore, in the cases of these test objects, it may be possible to promote the crystal growth of the LLZ in the separator 3 while suppressing the crystal growth of the LLZ in the porous body 21.

On the other hand, in the case of the test object T5, the kind and the amount of the sintering aid in the porous body 21 were same as the kind and the amount of the sintering aid in the separator 3. Therefore, the crystals of the LLZ in the porous body 21 and the LLZ in the separator 3 were similarly grown. As the result, in the case of the test object T5, the pore 211 of the porous body 21 disappeared, and the relative density increased.

In the case of the test object T6, the sintering aid was not used for both of the porous body 21 and the separator 3. Therefore, the crystal growth of the LLZ is insufficient. Therefore, the relative density of the separator 3 became low.

As show in the table 2, in the cases of test objects T7 to T10, the melting point of the sintering aid used for the porous body 21 is higher than the melting point of the sintering aid used for the separator 3. Therefore, in the cases of these test objects, it may be possible to promote the crystal growth of the LLZ in the separator 3 while suppressing the crystal growth of the LLZ in the porous body 21.

In the cases of the test object T11 and the test object T12, the sintering aid was used for only the separator 3. Therefore, it may be possible to promote the crystal growth of the LLZ in the separator 3 while suppressing the crystal growth of the LLZ in the porous body 21.

In the case of the test object T13, the heating temperature at the time of the sintering was excessively high. Therefore, the crystals of the LLZ in the porous body 21 and the LLZ in the separator 3 were similarly grown. As the result, in the case of the test object T5, the pore 211 of the porous body 21 disappeared, and the relative density increased.

In the case of the test object T14 shown in the table 3, the heating was performed at the temperature lower than 830° that is the melting point of the sintering aid. Therefore, the melt of the sintering aid could not be sufficiently formed. Therefore, in the test object T14, the crystal of the LLZ in the separator 3 could not be sufficiently grown, and the lithium-ion conductivity was lowered.

The present disclosure is not limited to the respective embodiments described above, and various modifications may be adopted within the scope of the present disclosure without departing from the spirit of the disclosure.

The invention claimed is:

1. A lithium-ion secondary battery comprising:
a single cell that includes a first electrode, a separator stacked on the first electrode, and a second electrode stacked on the separator,
wherein:
the first electrode includes
a porous body that
includes at least one LLZ-based solid electrolyte comprising a lithium lanthanum zirconate or a lithium lanthanum zirconate doped with an atom other than a Li atom, a La atom, and a Zr atom, and
has a pore, and
an active material held in the pore; and
the separator
has a relative density of 80% or more, and
includes (i) the at least one LLZ-based solid electrolyte comprising the lithium lanthanum zirconate or the lithium lanthanum zirconate doped with the atom other than the Li atom, the La atom, and the Zr atom, and (ii) at least one of a B atom, a P atom, or a Si atom, and
wherein:
the porous body includes the at least one of the B atom, the P atom, or the Si atom;
a total amount of the B atom, the P atom, and the Si atom in the porous body is less than a total amount of the B atom, the P atom, and the Si atom in the separator; and
a melting point of a sintering aid in the porous body is higher than a melting point of a sintering aid in the separator.

2. The lithium-ion secondary battery according to claim 1, wherein:
the separator includes the B atom; and
the porous body includes at least one of the P atom or the Si atom.

3. The lithium-ion secondary battery according to claim 1, wherein:
the separator includes the P atom; and
the porous body includes the Si atom.

4. The lithium-ion secondary battery according to claim 1, wherein
an average crystal grain size of the LLZ-based solid electrolyte in the separator is larger than an average crystal grain size of the LLZ-based solid electrolyte in the porous body.

5. A manufacturing method of the lithium-ion secondary battery according to claim 1, comprising:
generating a stacking body by stacking a first layer and a second layer, wherein the first layer includes the LLZ-based solid electrolyte and a pore forming material, and the second layer includes the LLZ-based solid electrolyte and a sintering aid including the at least one of the B atom, the P atom, or the Si atom; and
integrally forming the porous body and the separator by sintering the stacking body at a temperature equal to 700° or more and lower than 1050°.

6. The manufacturing method of the lithium-ion secondary battery according to claim 5, wherein
the sintering aid includes at least one of a $Li_3BO_3$, a $B_2O_3$, a $Li_3PO_4$, a $Li_4SiO_4$, or a $LizSiO_3$.

* * * * *